2,615,147

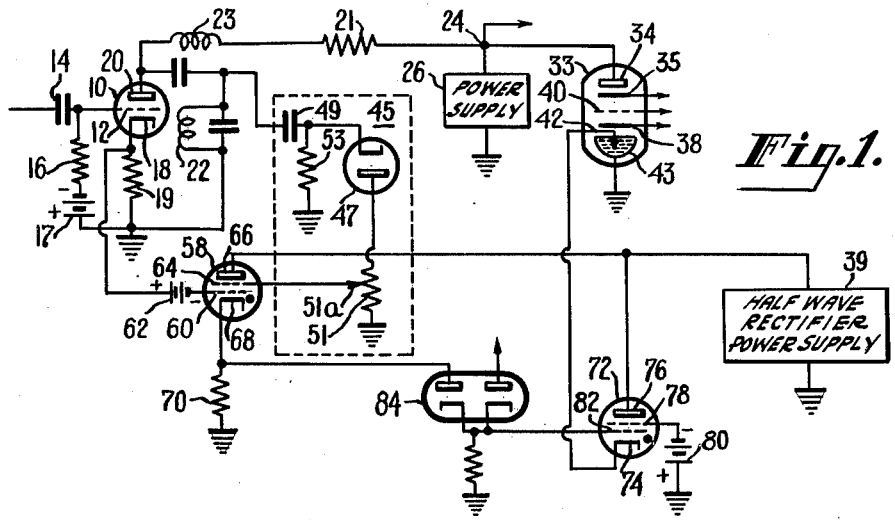
Fig. 1.
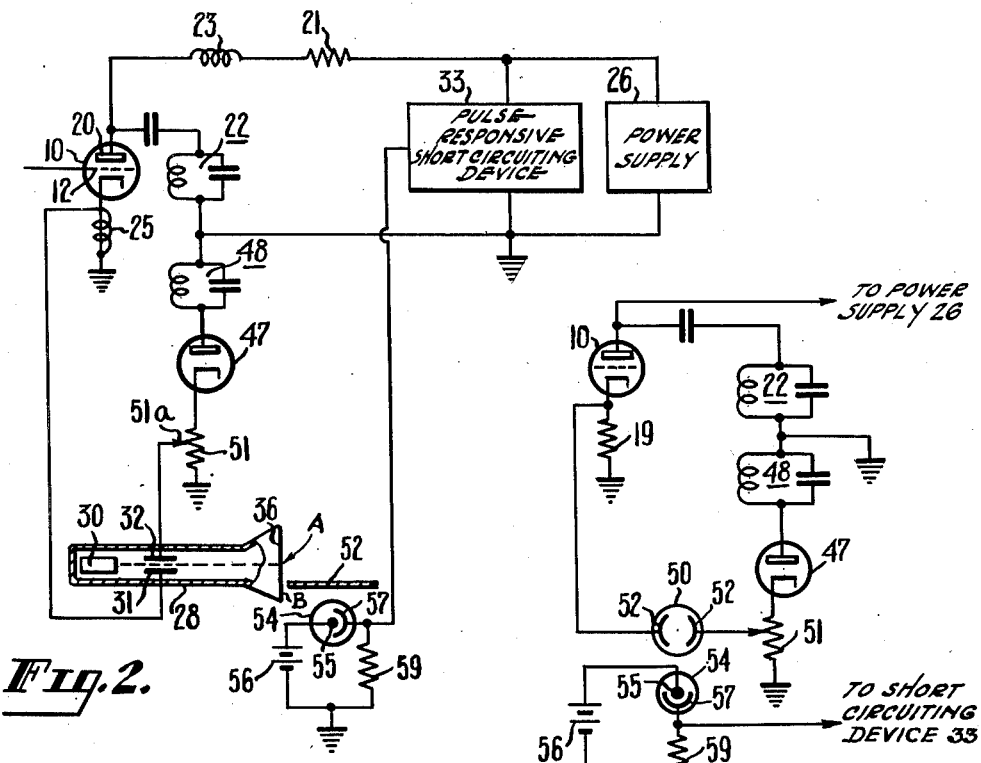
Fig. 2.
Fig. 3.
INVENTOR
MERLE V. HOOVER
BY Morris A. Rahm
ATTORNEY Patented Oct. 21, 1952

UNITED STATES PATENT OFFICE 2,615,147

ELECTRON TUBE PROTECTIVE SYSTEM

Merle Vincent Hoover, Mountville, Pa., assignor to Radio Corporation of America, a corporation of Delaware Application April 10, 1951, Serial No. 220,196

17 Claims. (Cl. 315—91)

This invention relates to improvements in electron tube protective systems, and particularly to systems for protecting electron tubes from abnormal localized currents, the present invention being, in part, a division of the copending application of W. N. Parker, H. C. Vance and M. V. Hoover, Serial Number 148,688, filed March 9, 1950, now Patent No. 2,575,232, and assigned to the assignee of the present invention.

In a copending application of L. P. Garner, Serial Number 148,723, filed March 9, 1950, now Patent No. 2,571,027, and assigned to the same assignee as the present invention, there is described and claimed an extremely fast acting system for protecting a high power oscillator or amplifier tube against a high current fault, such as an internal arc or an internal short, by short-circuiting the power supply of the tube. The short-circuiting device preferably comprises a normally non-conductive electron tube containing sufficient gas or vapor so that, when conducting current, the voltage drop thereacross will have a low, substantially constant value characteristic of a gas or vapor discharge (such a tube being referred to hereinafter as a "gas tube"). The initiation of current flow (hereinafter designated "firing") in the gas tube is arranged to occur only in response to the occurrence of a fault in the protected tube. It is one of the objects of the present invention to provide an improved fault-detecting arrangement for such protective systems.

In the above-mentioned Garner system, the gas tube firing voltage is derived from the current increase which accompanies a high current fault in the protected tube. While this fault detection arrangement is basically sound, it does not provide maximum possible sensitivity under all conditions of operation. For example, if a high power amplifier tube is being operated "Class C," so that tube current only flows during a part of each cycle of alternating voltage, the gas tube must be adjusted so that it will not fire until the protected tube current exceeds the normal peak value. This makes it possible for a fault to reach serious proportions before the protective system responds.

Accordingly, it is a further object of the invention to provide an improved fault detection circuit which is adapted to differentiate between a high current fault in the protected tube and other non-injurious changes in system operation.

In the above-noted copending application of W. N. Parker, H. C. Vance and M. V. Hoover, there is described a fault detecting circuit which depends for its operation on the unbalance between input and output power which accompanies a high current fault in the protected tube. Taking tube output voltage as substantially representative of output power, and tube input current as substantially representative of input power, the fault detecting circuit is arranged to fire the protecting gas tube upon simultaneous opposite changes occurring in these two parameters, thereby insuring rapid and dependable operation of the protective system. That is, an increase in input power, accompanied by a decrease in output power, will cause firing of the protecting tube. Of course, a change in only one of these parameters can cause slower firing.

In the specific fault detection circuit described in said copending Parker et al. application, a resistor-capacitor network is provided to eliminate pulsating components from the voltages representing the protected tube input and output power. The purpose of this resistor-capacitor network is to improve system sensitivity by eliminating voltage fluctuations which otherwise would have to be accounted for in setting the response level of the fault detector. However, this network also has the effect of increasing the response time of the system. That is, if the network is to be effective, the time constant thereof must be of the order of one half the period of the alternating voltage being amplified by the protected tube. Hence, the voltage across the resistor-capacitor network cannot change in an interval less than this half period. If the voltage being amplified by the protected tube is sufficiently high in frequency, this characteristic of the detection circuit will not be particularly objectionable. However, when relatively low frequencies are involved, it is possible for a fault to develop beyond permissible limits before the protective system will function.

It is, accordingly, a further object of the present invention to provide an extremely fast-acting fault detection circuit for a tube protective system.

In accordance with the invention, the foregoing and other related objects and advantages are attained in a fault detecting circuit wherein both the voltage proportional to the protected tube input power and the voltage proportional to tube output power are pulsating in form. In accordance with one embodiment of the invention, these pulsating voltages are of opposite polarity and are applied as separate control voltages to a trigger circuit which will respond to simultaneous opposite changes of the pulsating control voltages. In other embodiments of the invention, pulsating control voltages of the same polarity are utilized with novel forms of trigger circuits to obtain a voltage pulse for triggering a protecting gas tube.

A more complete understanding of the invention can be had by reference to the following description of illustrative embodiments thereof, when considered in connection with the accompanying drawing, in which Fig. 1 is a circuit diagram of an electron tube protective system arranged in accordance with the invention, and Figs. 2 and 3 are circuit diagrams of modified forms of fault detecting circuits for protective systems arranged in accordance with the invention.

Referring to Fig. 1 of the drawing, there is shown a triode electron tube 10 connected as an alternating voltage amplifier, as, for example, in the output stage of a conventional radio transmitter. It will be understood that the tube 10 could as well be connected as an oscillator by providing suitable feedback connections between the anode and control grid circuits. Also, the protection of a tube connected as a modulator or as a "buffer" is deemed to be within the scope of the invention.

The tube 10 is arranged to amplify alternating voltages applied to the control grid 12 thereof through a coupling capacitor 14. The usual grid return resistor 16, and a bias voltage source shown as a battery 17, are connected between the control grid 12 and the grounded end of a resistor 19 which is connected between ground and the cathode 18 of the tube 10. The tube anode 20 is connected to a resonant tank circuit 22 from which amplified alternating voltage can be supplied to any suitable load (not shown), such as an antenna, an additional amplifier, or the like.

The tube anode 20 is connected through a resistor 21 and a choke coil 23 to the positive terminal 24 of a unidirectional voltage supply source 26.

In the case of a high power radio transmitter, the voltage applied to the tube anode 20 from the power supply 26 may be of the order of several thousand volts. As long as the tube 10 is functioning properly, the power dissipated at the tube anode 20 will be within safe limits. However, if an arc should form between the tube anode 20 and cathode 18 through stray residual gas in the tube 10, the tube current will rise far beyond its rated value, and this excessive current ordinarily will flow between localized spots on the anode and cathode. Under these conditions, one or both of the tube electrodes 18, 20 may melt within a few hundred microseconds. Even if the electrodes do not melt appreciably, enough gas may be evolved to tend to reduce electron emission as well as to enhance the possibility of subsequent arcs.

In accordance with the aforementioned Garner application, protection for the tube 10 is provided by a normally non-conductive short-circuiting device comprising an ignitron type gas tube 33 shunted across the power supply 26. The main anode 34 of the ignitron 33 is connected directly to the positive power supply terminal 24. The ignitron dividing anode 35, the auxiliary anode 38 and the grid 40 may be energized from the same or a separate power supply, as desired. An igniter electrode 42 is connected to receive firing voltage from a fault detecting circuit, as described hereinafter, and the mercury pool cathode 43 is connected to ground.

In accordance with the usual principle of operation of the ignitron type tube, the tube 33 will be non-conductive until a positive voltage is applied to the igniter electrode 42. Thereupon, a small arc will form between the igniter 42 and the cathode pool 43, and this small arc will spread to the anodes 34, 35, 38, substantially instantaneously. Although the ignitron 33 is adapted to withstand very high voltages prior to firing, the voltage drop thereacross after firing is very low—say of the order of 15 or 20 volts. By arranging the ignitron 33 to fire in response to the occurrence of a high current fault in the tube 10, it can be seen that the ignitron effectively will short-circuit the power supply 26 if such a fault occurs, thereby diverting the current which otherwise would soon ruin the protected tube.

In accordance with the present invention one section of the fault detection circuit shown in Fig. 1 comprises means 45 for generating a pulsating voltage proportional to the protected tube output voltage. The other section of the circuit comprises the resistor 19, which is connected in the protected tube cathode circuit to comprise generating means for a pulsating voltage proportional to the protected tube current (i. e. input power).

The network 45 comprises a half wave rectifier 47, connected to the tube output circuit 22 through a coupling capacitor 49 to generate a negative pulse of voltage across a potentiometer 51 during each positive half cycle of voltage at the grid 12 of the tube 10. A resistor 53 completes the circuit for the rectifier 47.

A gas tetrode tube 58 has a control grid 60 which is connected through a biasing battery 62 to the protected tube cathode 18, and a screen grid 64 which is connected to the potentiometer tap 51a and serves as a second control grid in the tube 58. The gas tetrode anode 66 is connected to a half wave rectifier power supply 39, and the cathode 68 of the gas tetrode 58 is connected to ground through a load resistor 70.

As long as the protected tube 10 is operating normally, the tendency for the tube 58 to fire in response to positive voltage impulses applied to the control grid 60 thereof will be overcome by the negative voltage impulses on the screen grid 64. However, if a fault should develop in the protected tube 10, the positive voltage pulses at the control grid 60 of the gas tetrode 58 will increase in amplitude, while the negative voltage impulses applied to the screen grid 64 will decrease in amplitude, allowing the tetrode 58 to fire very quickly after a fault begins to develop. When the gas tube 58 fires, a positive voltage pulse will be developed across the load resistor 70, and this positive pulse can be utilized to fire the ignitron 33.

A second gas tetrode 72 is provided for coupling the fault detecting circuit just described to the ignitron 33 to fire the ignitron upon the occurrence of a fault in the protected tube 10. The cathode 74 of the second tetrode 72 is connected to the igniter electrode 42 in the ignitron 33, and the anode 76 of the tetrode 72 is connected to the auxiliary power supply 39. The screen grid 78 in the second tetrode 72 is connected to a source of negative voltage, shown as a battery 80, to normally prevent conduction in the tetrode 72. The control grid 82 of the tetrode 72 is connected to the load resistor 70 of the first gas tetrode 58 through a coupling diode 84. As shown, the diode 84 may comprise two or more sections to provide coupling between the firing tube 72 and additional amplifier tubes 10 (not shown) which are energized from the power supply 26. Thus, upon the occurrence of a fault in any of the protected tubes 10, the gas tetrode 72 will conduct and fire the ignitron 33 to short-circuit the power supply 26.

While the coupling diode 84 is not essential, it is deemed preferable in order to decouple the cathode circuits of the protected tubes.

The auxiliary power supply 39 preferably is of the half wave rectifier type, as indicated, so that the gas tetrodes 58, 72 will deenergize readily after firing.

In Fig. 2 of the drawing there is shown another embodiment of the invention wherein a different type of trigger pulse generator is utilized, and wherein the pulses representative of tube input power are obtained in a different manner than that shown in Fig. 1.

In the circuit of Fig. 2, the cathode resistor 19 has been eliminated from the circuit of the protected tube 10, and in its place there has been substituted an inductor 25 which is coiled around the lead between ground and the protected tube cathode 18. In some instances, it is not convenient to have a resistor in the cathode circuit for the protected tube. In such case, the inductive pulse-pickup arrangement comprising the coil 25 can be used to advantage, provided the pulses induced in the coil 25 are in the proper time-phase with respect to the pulses representing output power.

In place of the gas tetrode tube 58 of Fig. 1, there is provided in the circuit of Fig. 2 a cathode ray tube 28 having the usual electron gun 30, a pair of deflecting electrodes 31, 32 and a fluorescent screen 36. Other details of the cathode ray tube 28, as well as the energizing circuit therefor, have not been shown since all are well known per se and are not essential to an understanding of the invention.

Adjacent the screen end of the cathode ray tube 28, there is provided a photocell 54 having an anode 55 connected to an energizing voltage source shown as a battery 56. The photo-cathode 57 of the cell 54 is returned to the voltage source 56 through a resistor 59.

One of the deflecting plates 31 of the tube 28 is connected to the pulse pick up inductor 25. The other plate 32 is connected to the tap 51a of a potentiometer 51 in the cathode circuit of a rectifier 47. In the anode circuit of the rectifier 47, there is provided a resonant circuit 48 which is inductively coupled to the resonant circuit 22 of the protected tube 10.

As long as the tube 10 is functioning normally, positive voltage pulses developed in the inductor 25 by pulsating current flow through the tube 10 may tend to attract the electron beam in the tube 28 downwardly, but this tendency will be offset by positive pulses developed across the potentiometer 51 by rectification of the oscillatory voltage coupled into the resonant circuit 48. Therefore, the beam in the tube 28 will tend to stay at or near the center of the screen 36 (at point "A"). As long as this condition obtains, the photocell 54 will not conduct any appreciable current. If necessary, a light shield 52 can be placed adjacent the photocell 54 to prevent any light from the screen 36 impinging on the cathode 57 as long as the cathode ray beam is approximately centered.

If a fault occurs in the tube 10, the current flowing thereto will rise abruptly, causing a relatively large positive pulse to be developed across the inductor 25. At the same time, the oscillatory voltage coupled into the resonant network 48 will decrease, causing a decrease in the amplitude of the voltage pulses developed across the potentiometer 51. As a result, the cathode ray beam will be attracted downwardly in the tube 28, and will impinge on the lower portion of the screen 36, say at point "B." This will allow the photocell 54 to conduct current, developing a positive pulse of voltage across the resistor 59. This positive voltage pulse then can be utilized to trigger a short-circuiting device 33 to divert power from the protected tube 10 in the manner already described in connection with Fig. 1.

It will be understood that the circuit of Fig. 2 could be arranged with the resistor 19 in the cathode circuit of tube 10 in place of the inductor 25. Similarly, the inductor 25 could be used as a pick-up element in a non-differential fault detecting system such as that disclosed in the above-mentioned co-pending Garner et al. application.

In Fig. 3, a further form of fault detecting and pulse generating means is illustrated. In Fig. 3, there is shown only the tube 10 and such portions of the circuit thereof as are necessary to depict the embodiment of the invention presently being described.

In this case, the pulse generating means comprises a so-called neon glow tube 50 having a pair of electrodes 52 connected to a cathode load resistor 19 for the tube 10 and a potentiometer 51 in the cathode circuit of a half wave rectifier 47. The circuit of the half wave rectifier 47 is the same as that shown in Fig. 2.

A photocell 54 is placed adjacent to the neon tube 50 and connected in a circuit identical with that shown for the photocell 54 in Fig. 2.

As long as the tube 10 in Fig. 3 is functioning properly, voltage pulses generated by tube current flow through the resistor 19 will be offset by voltage pulses developed across the potentiometer 51, so that equal voltages will be applied to the neon tube electrodes 52. Thus, the neon tube will not ignite, and the photocell 54 will conduct substantially no current. If a fault occurs in the protected tube 10, the voltage developed across the resistor 19 will increase rapidly, while the voltage across the potentiometer 51 will drop rapidly. As a result, sufficient voltage will be developed between the neon tube electrodes 52 to generate a pulse of light from the neon tube. This, in turn, will allow a pulse of current to flow through the photocell 54, thereby to generate a voltage pulse across the resistor 59. This pulse developed across the resistor 59 can then be utilized to trigger the short-circuiting device in the manner already described.

It should be noted that a fault detector such as the tube 28 of Fig. 2 or the tube 50 of Fig. 3 could be used with unidirectional "fault" voltages such as are developed in the system of the above-mentioned Parker et al. application.

From the foregoing, it can be seen that the present invention provides an extremely fast acting fault detecting arrangement for electron tube protective systems, and one that is capable of execution in a variety of simple and efficient circuits.

What is claimed is:

1. A fault-detecting circuit for an electron tube connected in a network to amplify alternating voltages, said circuit comprising a first voltage generating means coupled to said network for generating a first pulsating voltage in response to pulsating current flow through said tube, a second voltage generating means coupled to said tube to generate a second pulsating voltage proportional in amplitude to the alternating output voltage of said tube, a pulse generator circuit for generating a fault-indicating voltage pulse only in response to a combination of pulses of predetermined amplitude from said first and second generating means, and pulse-transfer circuits connecting each said generator to said pulse generator circuit.

2. A fault-detecting circuit as defined in claim 1 wherein said first means comprises a first resistor connected in series with said tube and said second means comprises a half wave rectifier network connected to rectify said alternating output voltage of said tube.

3. A fault-detecting circuit as defined in claim 1 wherein said first means comprises a pickup coil inductively coupled to said network and said second means comprises a half wave rectifier network connected to rectify said alternating output voltage of said tube.

4. A fault-detecting circuit for an electron tube protective system of the type wherein a normally non-conductive short-circuiting device is shunted across the supply voltage source for an electron tube connected to amplify alternating voltages, said circuit comprising a first voltage generating means in circuit with said tube for generating a first pulsating voltage in response to pulsating current flow through said tube, a second voltage generating means coupled to receive alternating voltage from said tube to generate a second pulsating voltage proportional in amplitude to the alternating output voltage of said tube, means connected to said first and said second generating means to generate a fault-indicating voltage pulse only in response to a combination of pulses of predetermined amplitude from said first and second generating means, and means coupled to said last named means to initiate conduction in said short-circuiting device in response to said fault-indicating voltage pulse.

5. A circuit as defined in claim 4 wherein said last named means comprises a cathode ray tube having deflecting electrodes connected to said first and second generating means, and a photocell arranged to pass current in response to predetermined deflection of the cathode ray beam in said cathode ray tube.

6. A circuit as defined in claim 4 wherein said last named means comprises a neon glow tube having a pair of electrodes connected to said first and second generating means, and a photocell arranged to pass current in response to energization of said glow tube.

7. A system for protecting an electron tube connected in a circuit to amplify alternating voltages, said circuit including a unidirectional voltage source connected to furnish anode voltage to said tube, said system comprising a normally non-conductive gas tube shunting said voltage source to short-circuit said source in response to a voltage of predetermined magnitude applied to a firing control electrode of said gas tube, a resistor connected in the cathode circuit of said tube, means in circuit with said tube for generating voltage pulses across said resistor in response to pulsating current flow through said tube, means coupled to said tube to generate voltage pulses proportional in amplitude to the alternating output voltage of said tube, and means coupled to said gas tube and responsive to said pulsating voltages to provide to said gas tube a fault-indicating voltage.

8. In a fault-detecting circuit for an electron tube connected to amplify alternating voltages, in combination, a first resistor in series with said tube for generating voltage pulses in response to pulsating current flow through said tube, a network comprising a half wave rectifier and a second resistor connected to said tube to generate across said second resistor voltage pulses from alternating voltage received from said tube, a gas tube having first and second control electrodes, and connections from said resistors to said control electrodes.

9. In a fault-detecting circuit for an electron tube connected to amplify alternating voltages, in combination, a resistor in circuit with said tube for generating a first pulsating unidirectional voltage in response to current flow through said tube, a rectifier connected to said tube to generate a second pulsating unidirectional voltage from alternating voltage received from said tube, a gas tube having first and second firing control electrodes connected one to said resistor and one to said rectifier, and a bias voltage source connected to one of said control grids normally to prevent current flow in said gas tube.

10. In a protective system for an electron tube connected to amplify alternating voltages and supplied with unidirectional operating voltage from a high voltage source, in combination, an ignitron gas tube having an anode, a mercury pool cathode, and an igniter electrode, a circuit connecting said ignitron gas tube in parallel with said voltage source, said electron tube having a cathode, a resistor connected between the cathode of said electron tube and said voltage source to develop across said resistor first voltage pulses proportional in amplitude to current pulses flowing through said electron tube, a rectifier network coupled to said electron tube to generate second voltage pulses proportional in amplitude to the alternating output voltage of said electron tube, and means coupling said resistor and said rectifier network to said igniter electrode to fire said ignitron tube in response to a predetermined combination of said first and said second pulse voltages.

11. Apparatus as defined in claim 9 wherein said coupling means comprises a gas tube having first and second control grids, one of said control grids being connected to said resistor and the other of said control grids being connected to said rectifier network.

12. Apparatus as defined in claim 11 including, as a source of operating voltage for said gas tube, a half wave rectifier power supply whereby to permit deenergizing said gas tube after firing thereof.

13. In a system for protecting an electron tube connected in a circuit for amplifying alternating voltages and including a unidirectional voltage source connected to furnish anode voltage to said tube and a normally non-conductive gas tube shunting said voltage source to short-circuit said source in response to an impulse applied to a firing control electrode of said gas tube, in combination, a grid-controlled gas tube having an anode, a cathode, and first and second control grids, a bias voltage source connected to one of said control grids normally to prevent current flow in said grid-controlled gas tube, first means coupled to said first control grid and to said electron tube circuit for generating and applying to said first control grid a voltage impulse of one polarity during half of each cycle of alternating voltage amplified by said electron tube, second means coupled to said second control grid and to said electron tube circuit for generating and applying to said second control grid a voltage impulse of polarity opposite to said one polarity during each said half cycle, and means coupling said grid-controlled gas tube to said firing control electrode to fire said shunting gas tube in response to current flow in said grid controlled gas tube.

14. In an electron tube protective system of the type wherein a normally non-conductive short-circuiting device is shunted across the supply voltage source for an electron tube having an anode and a cathode connected to said source, a fault-indicating-voltage generator comprising an inductor inductively coupled to said connection between said cathode and said source to generate a voltage pulse in response to a change in the current through said connection, and means responsive to said voltage pulse to render said normally non-conductive device conductive.

15. In an electron tube protective system of the type wherein a normally non-conductive short-circuiting device is connected in shunt with the supply voltage source for an electron tube, and wherein means are provided for generating separate voltages representative respectively of the input and output power flowing to and from said tube, the improvement which comprises a photocell, a pulse generating circuit including said photocell for generating a voltage pulse upon impingement of a light pulse on said photocell, means coupling said pulse generating means to said short-circuiting device to render said device conductive in response to a pulse from said circuit, and means responsive only to a predetermined combination of said separate voltages to supply a light pulse to said photocell.

16. A system as defined in claim 15 wherein said last named means comprises a cathode ray tube having deflecting electrodes connected to said voltage generating means.

17. A system as defined in claim 15 wherein said last named means comprises a neon glow tube having a pair of electrodes connected to said voltage generating means.

MERLE VINCENT HOOVER.

REFERENCES CITED

The following references are of record in the file of this patent:

UNITED STATES PATENTS

| Number | Name | Date |
|---|---|---|
| 2,571,027 | Garner | Oct. 9, 1951 |
| 2,575,232 | Parker et al. | Nov. 13, 1951 |